G. W. DUNHAM.
LUBRICATING SYSTEM FOR COMBINED MOTOR AND TRANSMISSION UNITS.
APPLICATION FILED AUG. 3, 1910.
1,112,528. Patented Oct. 6, 1914.
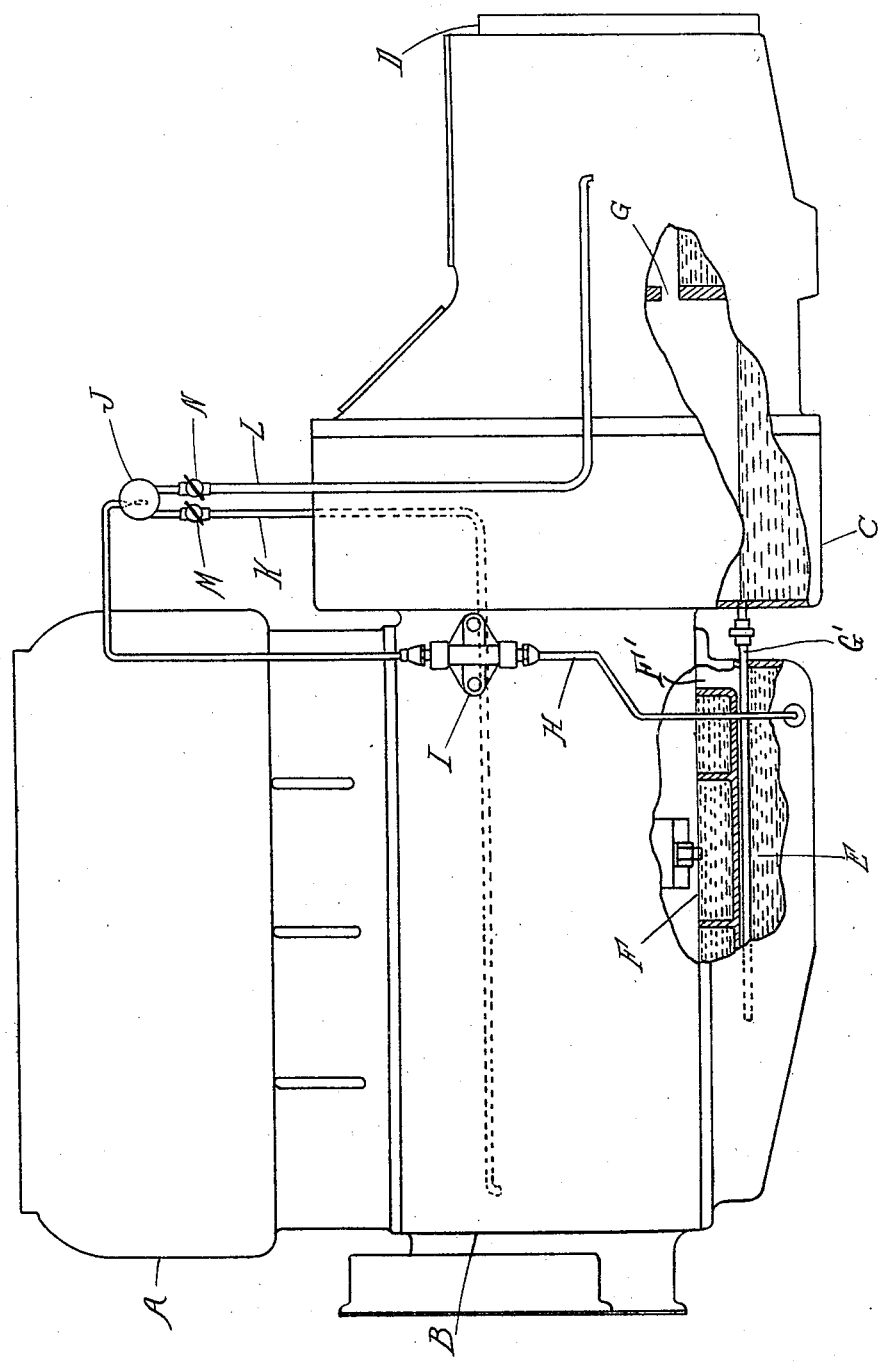

UNITED STATES PATENT OFFICE.

GEORGE W. DUNHAM, OF DETROIT, MICHIGAN, ASSIGNOR TO CHALMERS MOTOR COMPANY, OF DETROIT, MICHIGAN, A CORPORATION OF MICHIGAN.

LUBRICATING SYSTEM FOR COMBINED MOTOR AND TRANSMISSION UNITS.

1,112,528. Specification of Letters Patent. Patented Oct. 6, 1914.

Application filed August 3, 1910. Serial No. 575,252.

*To all whom it may concern:*

Be it known that I, GEORGE W. DUNHAM, a citizen of the United States of America, residing at Detroit, in the county of Wayne and State of Michigan, have invented certain new and useful Improvements in Lubricating Systems for Combined Motor and Transmission Units, of which the following is a specification, reference being had therein to the accompanying drawings.

The invention relates to motor and transmission units more particularly designed for use on automobiles, and it is the object of the invention to obtain a construction of lubricating system by which both the engine and the transmission gearing may be supplied with lubricant from a single source and through the operation of a single pump.

To this end the invention consists in the construction as hereinafter described.

The drawing shows a diagrammatic longitudinal section through a motor and transmission unit to which my invention is applied.

A is a multi-cylinder engine having a common crank case B for all the cylinders with a fly-wheel housing C at one end thereof.

D is a housing for the variable speed transmission gearing which is secured to the fly-wheel housing C and projects laterally therefrom.

In the lower part of the crank case B is an oil-well E. Above this is a splash pocket F having an overflow connection F' into the oil-well. There is also an oil chamber formed in the housing D for lubricating the transmission elements therein, and an overflow passage G connects this oil chamber with a second oil chamber in the fly-wheel housing, this latter chamber having an overflow connection G¹ leading to the oil well E.

H is an oil conduit connected with the oil-well E and leading to a pump I by which the oil is elevated.

J is a sight-feed through which the oil elevated in the conduit H is discharged, K and L are branch conduits leading from the sight-feed and respectively controlled by adjustable valves M and N. The conduit K leads to the crank case and discharges thereinto at a point above the level of the oil in the splash pocket. The conduit L leads to the gear housing D and discharges above the level of oil in this casing. Thus, in operation a constant supply of lubricant is provided for each of the housings, while the surplus overflows into a common oil-well. By suitable adjustment of the valves M and N the distribution of the lubricant may be properly proportioned.

What I claim as my invention is:

1. The combination with a crank case, a transmission gearing housing and a fly-wheel housing intermediate said crank case and transmission gearing housing, of an oil well beneath said crank case, overflow connections from said transmission gearing housing into said fly-wheel housing, and from the latter into the oil well, an overflow from the crank case to the oil well; a pump for elevating the oil from said oil-well, a conduit through which the oil is propelled having a sight-feed therein, and valve controlled branches beyond said sight-feed for distributing the lubricant to the crank case and transmission gearing housing respectively.

2. The combination with the crank case having a splash pocket, a fly-wheel housing and a transmission gearing housing, of an oil well beneath said splash pocket, means for supplying oil from said well to the splash pocket and one of said housings, an overflow from the latter housing to the other housing, and overflow connections from the last mentioned housing and the splash pocket to the oil well.

3. The combination with a crank case having a splash pocket, of a transmission gearing housing, a fly-wheel housing intermediate said crank case and transmission gearing housing, an oil well beneath the splash pocket, overflow connections from the transmission gearing housing into the fly-wheel housing and from the latter into the oil well, an overflow from the splash pocket to the oil well, and means for supplying oil from said well to the splash pocket and a transmission gearing housing.

4. The combination with a crank case and transmission gearing housing, and a fly-wheel housing intermediate the crank case and the transmission housing, of an oil well beneath the crank case, overflow connections from the transmission gearing housing in the fly-wheel housing and from the latter into the oil well, an overflow from the crank case to the oil well, a pump for elevating the oil from said well, and conduits leading from the pump to the transmission housing and the crank case.

In testimony whereof I affix my signature in the presence of two witnesses.

GEORGE W. DUNHAM.

Witnesses:
T. P. CHASE,
C. E. GREGORY.